Jan. 12, 1932.   P. JULIEN   1,840,904
VALVE FOR CORROSIVE FLUIDS
Filed Jan. 7, 1930   3 Sheets-Sheet 1

Jan. 12, 1932.  P. JULIEN  1,840,904
VALVE FOR CORROSIVE FLUIDS
Filed Jan. 7, 1930   3 Sheets-Sheet 3
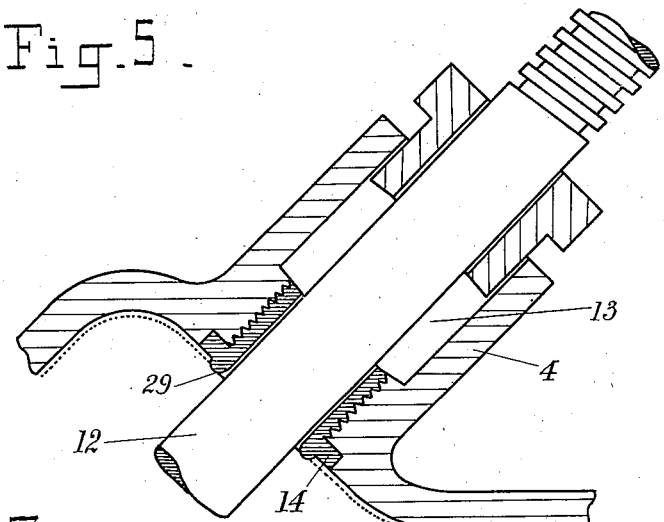
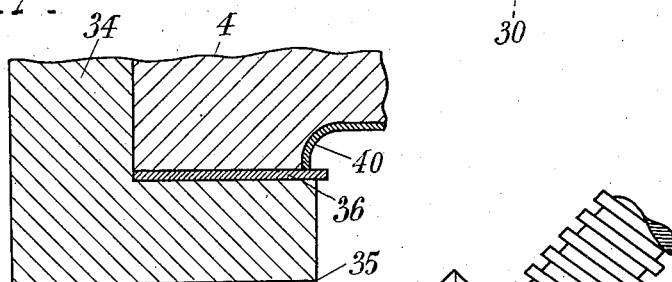
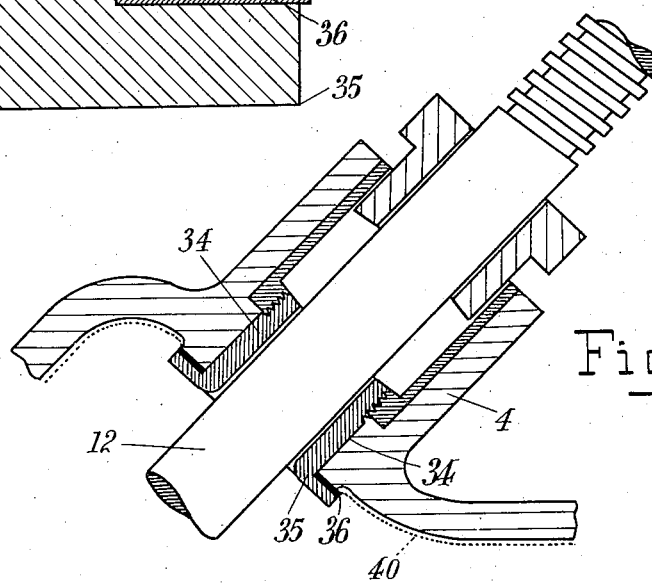

Patented Jan. 12, 1932

1,840,904

UNITED STATES PATENT OFFICE

PAUL JULIEN, OF MARSEILLES, FRANCE

VALVE FOR CORROSIVE FLUIDS

Application filed January 7, 1930, Serial No. 419,161, and in France January 29, 1929.

The generally employed valves are constituted by a casing in which the inlet and outlet conduits are separated by a partition provided with a seat for the flap; this partition which is cast in one with the casing prevents easy access to the interior and makes enamelling or metalization of the inner walls impossible.

The valve forming the subject of the present patent has been constructed principally with a view to remedying this drawback, whilst presenting also the advantage of reducing the pressure losses owing to the avoidance of rapid changes of direction; moreover, the tubular portions of this valve may be set as required. The valve is characterized by a circular groove intended to serve for the reception of the partition forming the seat, a tight joint being obtained by clamping in the plane of connection of the two tubular members. The partition is preferably a washer seat resting between two special joints also resisting corrosive fluids, said joints ensuring preservation at the intersection of the parts covered by enamel and those which are not enamelled. A rim or the like is provided on the bottom bushing of the stuffing box for the operating spindle, said rim serving as a rest for the spindle in its position corresponding to the maximum opening of the valve.

Two constiuctional forms of a valve made according to the invention are shown by way of example in the accompanying drawings:

Fig. 5 shows a detail, partly in section, of the first embodiment shown in Figs. 1, 2 and 3, Fig. 6 shows a detail, partly in section, of the second embodiment illustrated in Fig. 4, and Fig. 7 shows an enlarged part sectional view of part of the last-named detail.

Figure 1:
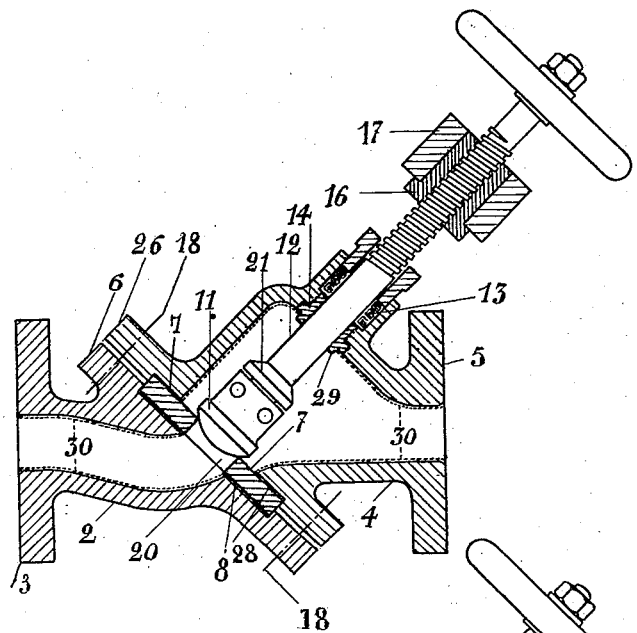
Fig. 1 is a view in longitudinal section of the first embodiment, the tubular parts of the valve arranged for a straight through way.

The novel valve consists essentially:

1. Of an independent separating partition 7 which has the form of a washer, of suitably calculated dimensions, the edge of the central opening 20 constituting a seat for a valve member 11.

2. Two flanges 6 and 26 with circular grooves serving for the reception of a washer-seat 7, which are connected and held tight by bolts 18 (in order to facilitate the reading of the drawings and the description, two of these bolts are deliberately arranged in the plane of the section).

The flanges 6 and 26 are respectively cast with the tubular portions 2 and 4. The passage of the inlet pipe 2, curved as little as possible, opens in a circle into the flange 6 and concentrically with the groove of the washer-seat 7; the outlet pipe 4 widened to allow of the free passage of the valve 11 is joined to the circular opening of the flange 26 (this opening being like that of flange 6 concentric with the groove containing the washer-seat 7) the interior convex portions of this outlet passage being reduced as much as possible in order to facilitate the enamelling operation.

The two tubular portions 2 and 4 are formed with flanges 3 and 5, these flanges for connection to pipes may be replaced by any other similar means of connection.

3. A valve member 11, an operating spindle threaded externally and an operating wheel the axis of which corresponds with that of the washer-seat 7 and lies at right angles with the plane of connection of the flanges 6 and 26.

4. A nut 16 of the operating spindle 12 supported by a yoke 17 which is fixed to the outlet pipe 4 by posts 19.

5. A stuffing box at the base of which is provided a bottom bushing 14, screwed and flanged and provided with a rim 29.

These various component parts having been described, it will be seen:

(a) That there is no obstacle to carrying out the metallization or enamelling of the inner walls of the casing of this valve.

(b) That the operating spindle, the valve member, the seat washer and the bottom bushing may be made of suitable metal.

(c) That with the arrangement according to Fig. 1 for a straight through way passage, the fluid is not subjected to sudden changes of direction.

Figure 2:
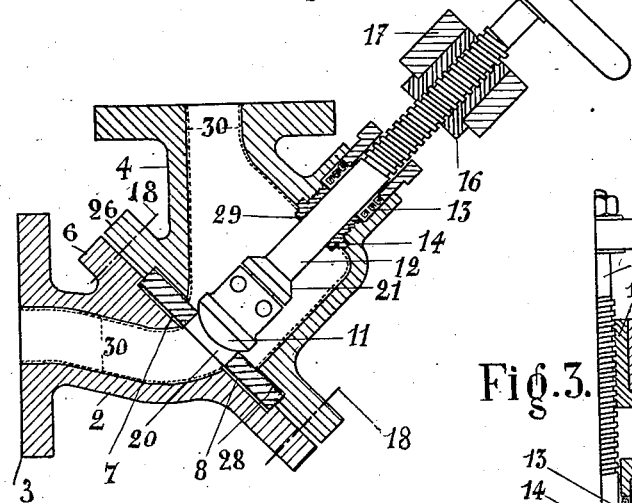
Fig. 2 is similarly a view in longitudinal section of the same members of this valve, the tubular parts being arranged for an angle way.
Figure 3:
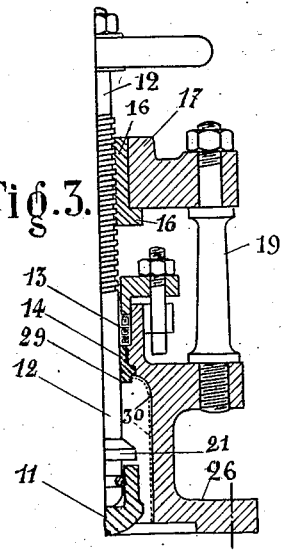
Fig. 3 is a transverse half section along the common axis of the seat, the disc and the operating spindle.

(d) That if the inclination of the plane of connection of the flanges 6 and 26 with regard to the axis of the flow passages is 45° (Fig. 1) it is easy to give to the tubular portions 2 and 4 various positions, particularly the angle position shown in Fig. 2.

(e) That a new seat is easily obtained by turning over the washer-seat 7.

The application of this valve, which is intended particularly for the chemical industry, may be extended to any other industry.

The valve for corrosive fluids is specially constructed with cast tubular portions 2 and 4 covered internally with an adhering layer of enamel 30. The washer 7, the valve member 11, operating spindle 12 and the bottom bushing 14 screwed under the stuffing box, are made of a metal which resists acids.

At the intersection of the parts covered with enamel and those which are not enamelled, preservation of the latter parts is ensured by special joints 8 and 28 which also resist corrosive fluids. The casing of the stuffing box is fitted with coiling 13 which is also not attackable.

In order to avoid straining of the enamel, the bottom bushing 14 of special steel screwed and flanged carries a rim which protects the layer of enamel. The shoulder 21 of the spindle 12 may without danger rest against the rim 29 when the valve member 11 assumes the position corresponding to the maximum opening, which in case of need enables repacking of the stuffing box when the valve is open.

Figure 4:
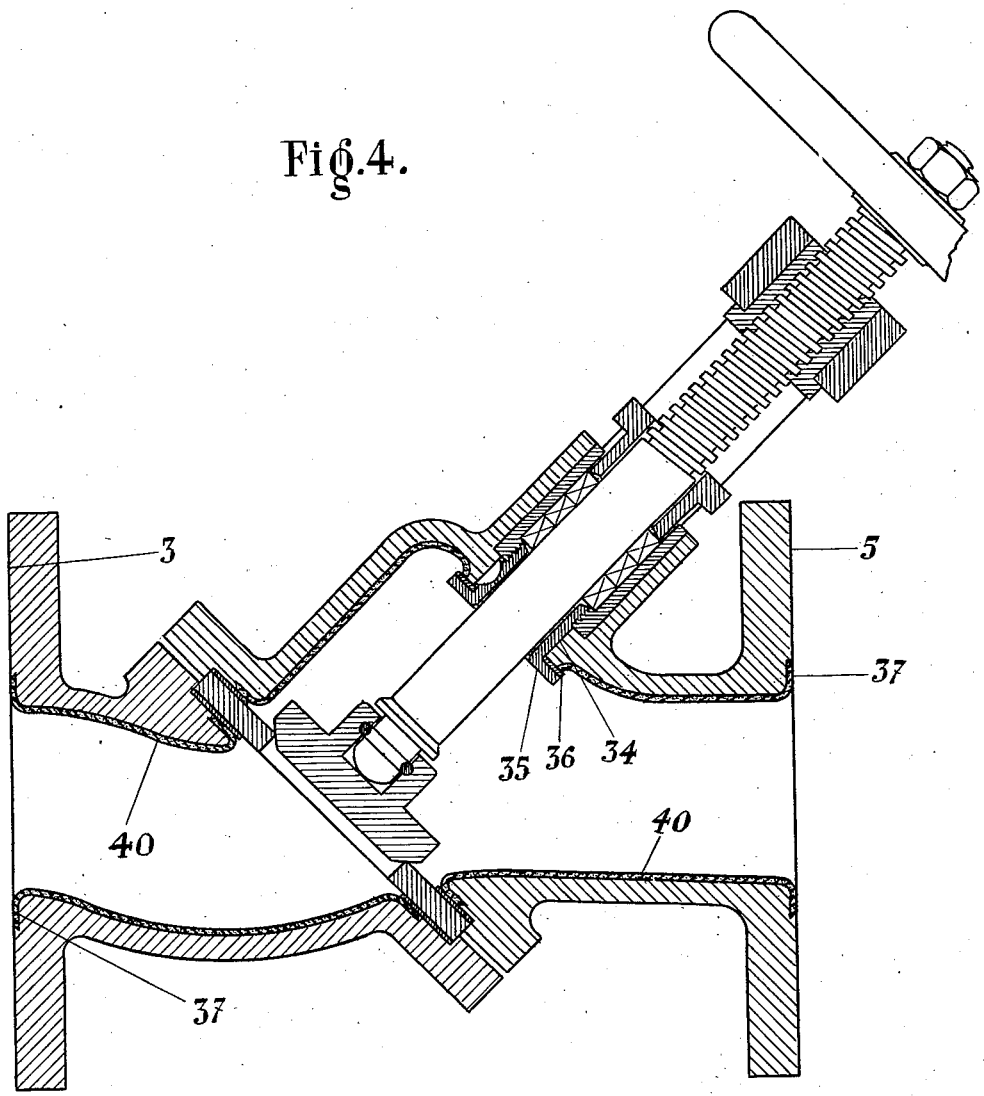
Fig. 4 is a view in longitudinal section of a second embodiment.

The second embodiment shown in Fig. 4 is very similar to the first and differs essentially in the manner in which the adhering layer of enamel, covering internally the tubular portion 4 has been protected against straining. For this purpose the bottom bushing 34 of special steel has a flange 35 projecting over the ends of the layer of enamel 40 around the opening carrying the bottom bushing 34. Between this end of the layer of enamel and the flange 35 is inserted a joint 36 also resisting corrosive fluids. Said joint 36 ensures the part of the cast iron casing not covered with enamel under the flange 35 against contact with the corrosive fluids, and covers also the end of the layer of enamel.

Also here on opening the valve the shoulder 21 of the spindle or stem 12 may touch and rest against the flange 35 without danger to the layer of enamel 40.

The two outer flanges 3 and 5 of the two tubular members 2 and 4 have each a circular groove next the bore serving for the reception of the end portions 37 of the inner layer of enamel 40, thus protecting also the inner edge of the flanges 3 and 5 by the same layer of enamel.

Claims:

1. In a valve for corrosive fluids the combination of: a casing of material attackable by corrosive fluids; a layer of enamel on the inner surface of said casing; a valve member; a valve stem carrying sail member, a seat for said valve member comprising a washer projecting over said layer of enamel; a packing ring on each side of said washer; a bore in said casing receiving said valve stem; a contact surface round said bore; a bushing in the latter guiding said valve stem and provided with a flange at the inner side of the casing having a larger diameter than the contact surface and a packing ring between said flange and contact surface; the layer of enamel limited by the outer edge of said contact surface and the end of said layer of enamel covered by said last-named packing ring; said valve member, valve stem, valve seat, packing rings and bushing consisting of material resisting corrosive fluids.

2. In a valve for corrosive fluids the combination of: a casing of material attackable by corrosive fluids; a layer of enamel on the inner surface of said casing; a valve member; a valve stem carrying said member; a seat for said valve member comprising a washer projecting over said layer of enamel; a packing ring on each side of said washer; a bore in said casing receiving said valve stem; a contact surface round said bore; a bushing in the latter guiding said valve stem and provided with a flange at the inner side of the casing having a larger diameter than the contact surface; and a packing ring between said flange and contact surface; the flange being adapted to protect the layer of enamel from any possibility of contact with said valve stem and said valve member; and said valve member, valve stem, valve seat, packing ring and bushing consisting of material resisting corrosive fluids.

In testimony whereof I have affixed my signature.

PAUL JULIEN.